2,939,859

PROCESS FOR PREPARING RESINIFIED PRODUCT FROM POLYEPOXY POLYETHER AND AROMATIC - SUBSTITUTED - ALKENE - 1 AND COMPOSITION FOR PRODUCTION OF SAID PRODUCT

Gottfried Ernst Rumscheidt and Pieter Bruin, Amsterdam, Netherlands, assignors to Shell Oil Company, a corporation of Delaware No Drawing. Filed Mar. 21, 1955, Ser. No. 495,774

Claims priority, application Netherlands Mar. 31, 1954

6 Claims. (Cl. 260—45.5)

This invention relates to a process for preparing new and improved resinified products. More particularly, the invention relates to a process for preparing resinified products of high quality from mixtures of polyepoxy polyethers and aromatic-substituted alkenes-1, to the resulting products and to their utilization.

Specifically, the invention provides a new process comprising reacting together a mixture of polyepoxy polyether having an epoxy equivalency greater than 1.0 and an aromatic-substituted-2-alkene-1 in the presence of an epoxy resin curing agent, and also preferably in the presence of a peroxide catalyst. The invention further provides compositions prepared by the above-described process which are particularly suited for use in many applications, such as resinous castings, laminates of sheet material, and metal-to-metal adhesives.

It is known that resinous materials suitable for use in preparing coatings and castings may be obtained by esterifying glycidyl ethers of dihydric phenols with unsaturated fatty acids and then interpolymerizing the formed esters with an aromatic substituted alkene-1. This method leaves much to be desired. The process, for example, involves the two step treatment of the epoxy resins, the use of two additional components, and is rather difficult to operate due to danger of premature gelation. In addition, the resulting products do not have a viscosity as desired and when cured lack the degree of toughness and resistance to thermal shock needed for many applications.

It is an object of the invention to provide a new process for preparing resinous products of polyepoxy polyethers. It is a further object to provide a method for preparing resinified products of high quality from mixtures of glycidyl polyethers and aromatic-substituted alkenes-1. It is a further object to provide a method for preparing resinous products from mixtures of polyepoxy polyethers and aromatic-substituted alkenes-1 that is more economical and easier to operate than previous methods. It is a further object to provide a method for preparing resinous products from mixtures of polyepoxy polyethers and aromatic-substituted-2-alkenes-1 that give products that have lower viscosities and are more easily utilized in preparing castings and adhesives. It is a further object to provide a method for preparing resinous products from mixtures of polyepoxy polyethers and aromatic-substituted-2-alkenes-1 which have improved toughness and improved resistance to thermal shock. It is a further object to provide new resinous products prepared from polyepoxy polyethers and aromatic-substituted-2-alkenes-1 which are particularly suited for use in preparing castings, coatings and adhesives. Other objects and advantages of the invention will be apparent from the following detailed description thereof.

It has now been discovered that these and other objects may be accomplished by the process of the invention which comprises reacting together a mixture of a polyepoxy polyether having an epoxy equivalency greater than 1.0 and an aromatic-substituted-2-alkene-1 in the presence of an epoxy resin curing agent, and also preferably in the presence of a peroxide catalyst. It has been found unexpectedly that, even though the polyepoxy polyether reactant contains no unsaturated bonds that might polymerize with the styrene compounds, there is under the above-described conditions a surprising reaction and there is substantially no monomeric styrene compound or polymer in the product after the reaction is complete.

The process of the invention thus has many advantages as compared to the conventional method of introducing the styrene compounds as indicated above. This process, for example, eliminates the necessity of first reacting the polyepoxy polyethers with the drying oil acids. In addition, the process gives a product which is easier to use in its intended applications. The viscosity of the reaction mixture of the invention, for example, is much lower than that of a mixture of a polyepoxy polyether product and a curing agent. This is of importance in utilization as no heating or solvent is required when the mixture is poured into a mold or applied as an adhesive layer.

The low viscosities of the reaction mixture prepared according to the invention can be seen from the following table. The polyepoxy polyether used in this case was a glycidyl polyether of 2,2-bis(4-hydroxy phenyl) propane having a softening point of 25° C., a molecular weight of 470 and an epoxy equivalent of 0.40 per 100 g.

| Ratio of weight of styrene:glycidyl polyether | Viscosity in centistokes (25° C) |
|---|---|
| 0:100 | 100,000 |
| 5:100 | 22,400 |
| 10:100 | 5,920 |
| 15:100 | 1,720 |
| 20:100 | 610 |

Further advantage is found in the fact that as the aromatic-substituted-2-alkene-1 is firmly incorporated in the composition, in contrast to an inert solvent used for diluting the epoxy resins, there is no problem of the diluent remaining behind as such in the cured composition and having a harmful effect on the properties of the final products.

The properties of the products prepared by the process of the invention are also superior to the properties of the product prepared by the conventional method. The products of the invention, for example, have much better resistance to great changes of temperature (see Example 7), and are much tougher. The hardness of the new products, for example, is the same as that of the corresponding polyepoxy polyether in which no styrene compound was incorporated. In addition, the new process does not effect any change in the electrical properties.

The polyether polyepoxides used in the process of the invention comprise those compounds possessing two or more ether linkages (i.e.—O— linkages) and a plurality of 1,2-epoxy groups

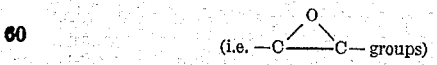

(i.e. —C—C— groups)

These polyether polyepoxides may be aliphatic, cycloaliphatic, aromatic or heterocyclic and may be substituted if desired with substituents, such as halogen atoms, hydroxyl groups, ether radicals, and the like, but are free of ethylenic or other polymerizable unsaturated linkages.

For clarity, many of the polyether polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyether polyepoxide material consists of a single compound and all of the epoxy groups are intact, the epoxy equivalency will be integers, such as 2, 3, 4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Polyether polyepoxides to be used in the process of the invention may be exemplified by 1,4-bis(2,3-epoxypropoxy)benzene, 1,3 - bis(2,3 - epoxypropoxy)benzene, 4,4' - bis(2,3 - epoxypropoxy)diphenyl ether, 1,3 - bis(2,3-epoxypropoxy)octane, 1,4-dis(2,3-epoxypropoxy) - cyclohexane, 4,4' - bis(2 - hydroxy - 3,4-epoxybutoxy)diphenyldimethylmethane, 1,3 - bis(4,5 - epoxypentoxy)-5-chlorobenzene, 1,4-bis(3,4-epoxybutoxy)2 - chlorocyclohexane, ethylene glycol diglycidyl ether, resorcinol diglycidyl ether, and 1,2,3,4 - tetra(2 - hydroxy - 3,4-epoxybutoxy)-butane.

Other examples include the glycidyl polyethers of polyhydric phenols obtained by reacting the polyhydric phenols with epichlorohydrin or dichlorohydrin in an alkaline medium. Polyhydric phenols that may be used for this purpose may be exemplified by 2,2-bis(4-hydroxyphenyl) propane (Bis-phenol-A), resorcinol, catechol, hydroquinone, methyl resorcinol, 2,2-bis(4-hydroxyphenyl) butane, 4,4'-dihydroxybenzophenone, bis(4-hydroxyphenol) ethane and 1,4-dihydronaphthalene as well as more complex polyhydric phenols such as pyrogallol, phloroglucinol and novolac resins from condensation of a phenol with an aldehyde in the presence of an acidic condensation catalyst. Preparation of glycidyl polyethers of novolac resin is described in Example 27 of German Patent No. 676,117.

The condensates prepared from the polyhydric phenols and the epichlorohydrin or dichlorohydrin may be represented by the formula

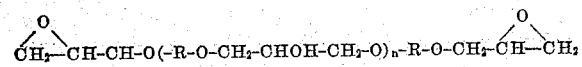

wherein R represents a divalent radical obtained by removing the hydrogen from two of the OH groups of the polyhydric phenol and $n$ is zero or an integer. The terminal groups, however, may also be to a greater or lesser extent phenol groups derived from the polyhydric phenol used.

Particularly preferred polyethers used in the invention are prepared from 2,2-bis(4-hydroxyphenyl)propane. They contain a chain of alternating glyceryl and 2,2-bis-(4-hydroxyphenylene)propane radicals separated by intervening etheral oxygen atoms and have a 1,2-epoxy equivalency between 1.0 and 2.0. Very suitable glycidyl polyethers of 2,2-bis(4-hydroxyphenyl)propane have a molecular weight of about 350 to 400 as is the case when $n$ values up to 1.3 in the above-described structural formula.

The glycidyl polyethers will be better understood from consideration of the following described preparations and the properties of the products. The parts are by weight.

POLYETHER A

About 2 moles of bis-phenol was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 355 (measured ebullioscopically in ethylene dichloride). The product had an epoxy value of 0.50 eq./100 g., and an epoxy equivalency of 1.75.

POLYETHER B

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semisolid having a melting point of 25° C. by Durrans' Mercury Method and a molecular weight of 470. The product had an epoxy value of 0.40 eq./100 g.

POLYETHER C

About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at 130° C. The Durrans' Mercury Method melting point of the resulting product is 52° C. and the molecular weight is about 710. The product has an epoxy value of 0.27 eq./100 g.

Other polyether polyepoxides comprise the polyglycidyl ethers of polyhydric alcohols obtained by reacting the polyhydric alcohol with epichlorohydrin, preferably in the presence of 0.1% to 5% by weight of an acid-acting compound, such as boron trifluoride or hydrofluoric acid and subsequently treating the resulting product with an alkaline component to effect dehydrochlorination of the product. Polyhydric alcohols that may be used for this purpose include among others glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4 - hydroxycyclohexyl)dimethylmethane, 1,4-dimethylolbenzene, 4,4' - dimethyldiphenyl, dimethylol toluenes, and the like, diglycerol, triglycerol, dipentaerythritol, tripentaerythritol, dimethylolanisoles, beta hydroxyethyl ethers of polyhydric alcohols, such as diethylene glycol, polyethylene glycols, bi(beta hydroxyethyl ether) or hydroquinone, bis(beta hydroxyethyl ether) of bisphenol, beta hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2'-dihydroxydiethyl sulfide, 2,2'-3,3'-tetrahydroxy dipropyl sulfide, dextrose, fructose, maltose and glyceraldehyde.

The above reaction is preferably effected by heating the polyhydric alcohol and epichlorohydrin at about 50° C. to 125° C. in proportions such that there is about one mole of epichlorohydrin for every equivalent of hydroxyl group in the polyhydric alcohol. The resulting chlorohydrin is then dehydrochlorinated by heating at about 50° C. to 125° C. with a small, e.g. 10% stoichiometrical excess of a base, such as sodium aluminate.

The preparation of one of these polyglycidyl ethers of polyhydric alcohols may be illustrated by the following examples showing the preparation of a glycidyl polyether of glycerol.

POLYETHER D

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substance removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 325 as measured ebullioscopically in dioxane solution. The epoxy equivalency of this product was 2.13.

Other polyepoxy polyethers include the polyepoxy-polyhydroxy polyethers obtained by reacting, preferably in an alkaline medium, a polyhydric alcohol or polyhydric phenol with a polyepoxide, such as the reaction product of a glycidyl ether of a polyhydric phenol with the same or different polyhydric phenol, the reaction product of glycerol and bis(2,3-epoxypropyl)ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis(2,3-epoxypropyl) ether, and the reaction product of catechol and bis(2,3-epoxypropyl) ether.

The aromatic-substituted-2-alkenes-1 used in the process of the invention are alkenes-1 having an aromatic radical attached to the number 2 carbon atom. Preferred are the aryl-2-alkenes-1, alkaryl-2-alkenes-1 and haloaryl-2-alkenes-1. Representative examples of these compounds include, among others, phenylethene (styrene), phenyl-2-propene (alpha-methyl styrene), phenyl-2-butene-1, orthomethylphenylethene, para-methylphenylethene, ortho - ethylphenylethene, para-ethylphenylethene, ortho, para - dimethylphenylethene, meta - isopropylphenylethene, para - chlorophenylethee, meta-chlorophenylethene, ortho - para-dichlorophenylethene, ortho-methylphenyl - 2 - propene, para-isobutylphenyl-2-butene-1, ortho-chlorophenyl-2-hexene-1, ortho-fluorophenylethene, para-bromo-phenyl-2-propene and ortho-chloro-para-bromophenylethene, and the like. Particularly preferred are those aromatic-substituted-2-alkenes-1 which are free of elements other than carbon, hydrogen and halogen. Especially preferred are the mono-aryl-2-alkenes-1, the alkaryl-2-alkenes and haloaryl-2-alkenes containing up to 4 carbon atoms in the alkene group and up to 12 carbon atoms in the aryl, alkaryl and haloaryl groups. It is particularly preferred to use an arylethene owing to its ease of polymerization in the process of the invention.

The polyether polyepoxide and the aromatic-substituted-2-alkenes-1 may be combined in ratios which vary from very small amount of the aromatic-substituted-2-alkenes-1, e.g. .1 part, to 99.9 parts of the polyether polyepoxide to preferably as high as 30 parts of the aromatic-substituted-2-alkenes-1 to 70 parts of polyether polyepoxide. Higher amounts of the aromatic-substituted-2-alkenes-1 such as 40 to 45 parts may be used, but in this case the substituted alkenes may be identified in the final product partly in the form of a homopolymer and/or as monomer. If the reaction is carried out in the presence of a peroxide catalyst, the polyether polyepoxide and aromatic-substituted-2-alkenes-1 are preferably combined in a ratio varying from 99:1 to 70:30, and more preferably from 90:10 to 70:30.

The curing agent used in the process of the invention may be an alkaline or acid acting curing material for epoxy resins. Examples of these materials include the amines, such as piperidine, diethylene triamine, triethanolamine, diethylaminopropylamine, 1,2-diamino-2-methylpropane, 2,3-diamino-2-methyl butane, 2,5-diamino-2,6-dimethyl pentane; salts of the amines, and particularly their fatty acid salts (2-ethyl pentane carboxylic acid being the preferred fatty acid), acid acting curing agents, such as organic and inorganic acids, their anhydrides and partial esters thereof as phosphoric acid, monobutyl esters of phosphoric acid, citric acid, acetic acid anhydride, tartaric acid, aconitic acid, oxalic acid, succinic acid, succinic acid anhydride, lactic acid, glutaconic acid, malonic acid, acetoacetic acid, trimellitic acid, phosphoric acid, boric acid, sulfonic acid, perchloric acid, persulfuric acid, p-toluenesulfonic acid, benzene sulfonic acid; and metal salts, such as zinc fluoborate, copper fluoborate and zinc phosphate. Particularly preferred curing agents comprise the alkaline-acting agent, polybasic acid and the amine salts of carboxylic acid. The curing agents are generally used in a quantity of 15%, preferably 4% to 12%, calculated on the weight of the mixture of the polyether polyepoxide and aromatic-substituted-2-alkenes-1.

As indicated, peroxide catalysts are preferably utilized along with the above-described epoxy curing agents. Examples of these peroxides include, among others, benzoyl peroxide, lauroyl peroxide, acetyl peroxide, benzoyl acetyl peroxide, tertiary butyl hydroperoxide tertiary butyl perbenzoate, ditertiary butyl peroxide, cumene hydroperoxide, monochloro ditertiary butyl peroxide, tertiary butyl peracetate, ditertiary butyl diperphthalate, tertiary butyl ethyl percarbonate, 2,2'-bis(tertiary butyl peroxy) butane, and the like and mixtures thereof. Particularly preferred catalysts include the dialkyl peroxides and more preferably the di-tert-alkyl peroxides, and the hydroperoxides, and particularly the alkyl, aryl and alkaryl hydroperoxides. The peroxides are preferably used in a quantity to 15% by weight, especially 4 to 12% by weight, calculated on the weight of the quantity of aromatic-substituted-2-alkenes-1 used. The use of the peroxides permits one to obtain products having larger quantities of the styrene compounds and thus improved properties for many applications.

Other substances, such as fillers, dyes, pigments, etc. may also be used in the reaction mixture of the invention.

The reaction is accomplished by mixing together the polyether, polyepoxide, aromatic-substituted-2-alkenes-1 and curing agent, and preferably in addition the peroxide catalyst. The temperature used in the reaction will depend upon the type of epoxy curing agent utilized. With the very active curing agents, the reaction may be accomplished at or near room temperature while with the other less active catalysts, higher temperatures e.g. 100°

C. to 120° C. may be used. If peroxides are employed, the temperature should, of course, be sufficient to effect a satisfactory decomposition of the peroxide to form free radicals.

The duration of the reaction depends on the number of circumstances such as the ratio of polyether polyepoxide to aromatic-substituted-2-alkene-1, the quantity and nature of the curing agent, the quantity and nature of the peroxide and the temperature employed. However, the reaction is preferably carried out in a period of less than 6 hours.

The products prepared according to the above-process are very suitable for the manufacture of castings. In this case, the above components are combined and the mixture placed in a mold or casting and then allowed to set. Heat may be applied as needed to assist in the cure.

The process of the invention may also be used to advantage in the manufacturre of laminated materials. The new reaction products have a very good adhesive power, so that they are very suitable for use as adhesives. For this purpose, the reaction mixture, which has scarcely reacted, is applied in the form of a layer to the material that is required to stick to each other, after which the reaction of the invention can occur in the layer applied.

The reaction products of the invention may also be applied as coatings.

The invention is illustrated by the following examples, but is not to be construed as limited to details described therein. The parts, ratios and percentages are by weight.

Example 1

A glycidyl polyether (Polyether B above) obtained by the condensation of bis-phenol(2,2-bis(4-hydroxyphenyl) propane) and epichlorohydrin in an alkaline medium, which polyether had a molecular weight of 470, a softening point of 25° C., and an epoxy value of 0.40 epoxide equivalents per 100 grams (1,2-epoxy equivalency of 1.88), was heated for 5 hours at 100° C. both with and without the quantities of styrene tabulated below along with the presence of an added 6% of piperidine on the mass to be cured, and in or without the presence of the tabulated quantities of di-tertiary-butyl peroxide. The products obtained were finely ground and extracted with boiling methyl ethyl ketone. The total quantity of the extract was determined, and it was also ascertained how much of this consisted of volatile products (styrene) and how much of non-volatile products (low-molecular polymers). The same results were obtained when benzene was used as solvent in place of methyl ethyl ketone.

| Weight Ratio Polyether to Styrene | Peroxide, Percent on Styrene | Extract, Percent of Total Product | | |
|---|---|---|---|---|
| | | Volatile | Non-Volatile | Total |
| 100:0 | 0 | 0.0 | 1.5 | 1.5 |
| 90:10 | 0 | 6.6 | 2.0 | 8.6 |
| 80:20 | 0 | 12.4 | ¹4.2 | 16.6 |
| 90:10 | 1 | 6.1 | 1.6 | 7.7 |
| 90:10 | 5 | 4.1 | 1.3 | 5.4 |
| 90:10 | 7 | 2.9 | 1.1 | 4.0 |
| 90:10 | 10 | 1.3 | 1.2 | 2.5 |
| 90:10 | 12 | 1.0 | 1.2 | 2.2 |
| 85:15 | 12 | 0.1 | 1.6 | 1.7 |
| 80:20 | 12 | 0.4 | 2.2 | 2.6 |
| 70:30 | 12 | 3.7 | ¹6.8 | 10.5 |

¹ The low-molecular product consisted chiefly of polystyrene.

The same results are obtained upon reducing the percentage of di-tertiary-butyl peroxide from 12 to 6 with a weight ratio of the polyether to styrene of 80:20.

Example 2

High frequency electrical properties were determined on castings prepared from mixtures with and without styrene. Mixtures of the glycidyl polyether described in Example 1 containing 0, 10 and 20% styrene along with 6% of piperidine based upon the polyether plus the styrene, and 12% di-tertiary-butyl peroxide based upon the styrene, were cured by heating for 5 hours at 100° C. The following table shows that the dielectric constant (DC) and the loss factor (LF) at 25° C., 450 kilocycles and a relative humidity of 50% of the styrene-containing products were appreciably lower than those of the previously known styrene-free products values as low as possible being desired.

| Weight Ratio of Polyether to Styrene | DC | LF |
|---|---|---|
| 100:0 | 4.1 | 0.021 |
| 90:10 | 3.5 | 0.016 |
| 80:20 | 3.6 | |

Example 3

Hard reaction products, from which only a very small amount of styrene, polystyrene or low-molecular polymers could be extracted, were obtained from a glycidyl polyether of 2,2-bis(4-hydroxyphenyl)propane (Polyether A above) having a molecular weight of 355, a softening point of 10° C. and an epoxy value of 0.50 epoxide equivalents per 100 grams, by curing 90 parts thereof with 10 parts of styrene at room temperature using 8 to 10% of diethylene triamine (based upon the polyether and styrene) and 10% of di-tertiary-butyl peroxide (based upon the styrene). The same result was obtained when curing was carried out at a higher temperature, e.g., 40° C.

If 80 parts of the glycidyl polyether and 20 parts of styrene were allowed to react at room temperature in the presence of the same quantity of diethylene triamine and di-tertiary-butyl peroxide, only the polyether was cured and most of the styrene was present in the resulting product as unconverted monomer. When, however, the reaction was carried out at 40° C., the quantity of styrene used was found to be almost completely incorporated in the final product.

The results follow.

| | | | |
|---|---|---|---|
| Ratio of Polyether to Styrene | 90:10 | 80:20 | 80:20 |
| Percent Diethylene triamine (based upon the polyether and styrene) | 10 | 10 | 8 |
| Percent Di-tertiary-butyl peroxide (based upon styrene) | 10 | 10 | 10 |
| Reaction Conditions: | | | |
| Temp., °C | 23 | 23 | 40 |
| Time | 1 day | 1 day | 3 hours |
| Extract, Percent of product: | | | |
| Low-molecular polymer | 1.4 | 0.5 | 2.2 |
| Styrene monomer | 1.9 | 16.3 | 1.4 |

Example 4

Instead of diethylene triamine, N,N-diethyl-1,3-diaminopropane was used as curing agent for a mixture of styrene and the glycidyl polyether described in Example 1, using a weight ratio of 20:80. The resinification was effected in the presence of 10% di-tertiary-butyl peroxide based upon the styrene. It was found that with a reaction temperature of 80° C., almost all of the styrene was incorporated. The results are tabulated below.

| | | |
|---|---|---|
| Ratio of Polyether to Styrene | 80:20 | 80:20 |
| Percent Amine (based upon the polyether and styrene) | 5 | 6 |
| Percent Di-tertiary-butyl peroxide (based upon the styrene) | 10 | 10 |
| Reaction Conditions: | | |
| Temp., °C | 80 | 60 |
| Time, hours | 3 | 7 |
| Extract, Percent of Product: | | |
| Low-molecular polymer | 1.7 | 0.5 |
| Styrene monomer | 2.8 | 15.3 |

Example 5

Hard resins containing much combined styrene were obtained using mixtures of triethanolamine with triethylamine or N,N-diethyl-1,3-diaminopropane as curing agent in curing mixtures of styrene and the glycidyl polyether described in Example 1. The results are given in the table below.

| | | |
|---|---|---|
| Ratio of Polyether to Styrene | 80:20 | 80:20 |
| Percent Amine (based upon the polyether and styrene): | | |
| Triethanolamine | 12 | 12 |
| Triethylamine | 1.5 | |
| Diethylaminopropylamine | | 2 |
| Percent Di-tertiary-butyl peroxide (based upon the styrene) | 10 | 10 |
| Reaction Conditions: | | |
| Temp., °C | 100 | 100 |
| Time, hours | 5 | 5 |
| Extract, Percent of product: | | |
| Low-molecular polymer | 3.3 | 2.9 |
| Styrene monomer | 2.7 | 2.7 |

Example 6

Other peroxides such as cumyl hydroperoxide may be used in place of di-tertiary-butyl peroxide. The hydroperoxides are somewhat less effective than dialkyl peroxides as shown by the results in the following table wherein the glycidyl polyether described in Example 1 was used.

| | | | | |
|---|---|---|---|---|
| Ratio of Polyether to Styrene | 80:20 | 80:20 | 80:20 | 80:20 |
| Percent Piperidine (based upon the polyether and styrene) | 6 | 6 | 6 | 6 |
| Percent Peroxide (based upon the styrene): | | | | |
| Di-tertiary-butyl peroxide | 10 | | | |
| Cumyl peroxide | | 5 | 10 | 15 |
| Reaction Conditions: | | | | |
| Temp., °C | 100 | 100 | 100 | 100 |
| Time, hours | 5 | 5 | 5 | 5 |
| Extract, Percent of Product: | | | | |
| Low-molecular polymer | 1.8 | ¹5.6 | ¹5.3 | ¹6.0 |
| Styrene monomer | 2.2 | 5.3 | 4.2 | 4.8 |

¹ Contained polystyrene.

Example 7

The resistance against cracking when subjected to large changes in temperature of reaction products of the invention having an iron cube embedded therein was compared to that of cured epoxy resins hitherto known. For this purpose, castings were prepared from a mixture of the glycidyl polyether used in Example 1 with 6% of piperidine, and from mixtures of this same polyether with 10, 20 and 30% of styrene (based upon the polyether plus the styrene), to which 6 parts by weight of piperidine per 100 parts by weight of the polyether plus the styrene, and 12 parts by weight of di-tertiary-butyl peroxide per 100 parts by weight of the styrene, were added. The mixtures in amount of 50 grams each were in containers having an iron cube with edges of 1.25 cm. suspended therein.

The castings were obtained by curing the mixtures for 5 hours at a temperature of 100° C., and after cooling, the castings were subjected to the following changes of temperature in succession:

Series A: 3 times (1 hour at −75° C., then 1 hour at 20° C.)
Series B: twice (1 hour at 100° C., next 1 hour at 20° C., then 1 hour at −75° C., and finally 1 hour at 20° C.)
Series C: twice (1 hour at 200° C., next 1 hour at 20° C., then 1 hour at −75° C., and finally 1 hour at 20° C.)

The casting of the styrene-free cured polyether mixture was found to resist the temperature cycling of Series A and B, but failed completely by developing cracks during the first series of treatment according to Series C when cooled from 20° C. to −75° C. On the other hand, it was found that the new castings of the invention made with the use of styrene passed the whole temperature cycling test, including all of Series C, without any cracking of the castings.

We claim as our invention:

1. A process for the production of resinified reaction products which consists of reacting together at a temperature between about 20° C. and 120° C. a mixture of (1) a polyether polyepoxide having a 1,2-epoxy equivalency greater than 1 and being free of unsaturated linkages which undergo addition polymerization, and (2) a 1-alkene substituted on number 2 carbon atom with an aromatic hydrocarbon radical and (3) up to 15%, based on the combined weight of the polyether and the alkene, of any epoxy resin curing agent that is free of unsaturated linkages which undergo addition polymerization, the said curing agent being selected from the group consisting of alkaline acting substances and amine salts of carboxylic acids so as to form a resinified product which is substantially free of monomeric alkene as such but has the alkene intimately bound in the resinified product, and said substituted alkene being the only component in said mixture which contains unsaturated linkages which undergo addition polymerization.

2. A process for the production of resinified reaction products which consists of reacting together at a temperature of about 50 to 120° C. a mixture of an alkene-1 of the group consisting of aryl-2-alkenes-1, alkaryl-2-alkenes-1 and haloaryl-2-alkenes-1, glycidyl polyether of a polyhydric component of the group consisting of polyhydric phenols and polyhydric alcohols, and having a 1,2-epoxy equivalency greater than 1.0 and being free of unsaturated linkages which undergo addition polymerization, a peroxide, and an epoxy resin curing agent free of unsaturated linkages which undergo addition polymerization and being selected from the group consisting of alkaline-acting substances and amine salts of carboxylic acids, so as to form a resinified product which is substantially free of monomeric alkene as such but has the alkene intimately bound in the resinified material, said mixture containing a weight ratio of the polyether to the alkene of about 99:1 to 70:30, up to about 15% of the peroxide based upon the weight of the alkene, and up to 15% of the curing agent based upon the combined weight of the polyether and the alkene, and the aforementioned substituted alkene-1 being the only component in said mixture which contains unsaturated linkages which undergo addition polymerization.

3. A process for the production of resinified reaction products which consists of reacting together at a temperature of about 50 to 120° C. a mixture of styrene, glycidyl polyether of a dihydric phenol having a 1,2-epoxy equivalency between 1.0 and 2.0 and being free of unsaturated linkages which undergo addition polymerization, a tertiary alkyl peroxide, and an amine which is free of unsaturated linkages which undergo addition polymerization, so as to form a resinified product which is substantially free of monomeric alkene as such but has the alkene intimately bound in the resinified material, said mixture containing a weight ratio of the polyether to the styrene of about 90:10 to 70:30, about 4 to 12% by weight of the peroxide in relation to the styrene, and about 4 to 12% by weight of the amine in relation to the polyether and the styrene, and the styrene being the only component in said mixture which contains unsaturated linkages which undergo addition polymerization.

4. A process as defined in claim 3 wherein the phenol is 2,2-bis(4-hydroxyphenyl)propane, the peroxide is di-tertiary-butyl peroxide, and the amine is diethylene triamine.

5. A composition suitable for production of resinified products consisting of a mixture of a monoaryl-2-alkene-1, glycidyl polyether of a dihydric phenol having a 1,2-epoxy equivalency between 1.0 and 2.0 and being free of unsaturated linkages which undergo addition polymerization, a peroxide, and an epoxy resin curing agent free of unsaturated linkages which undergo addition polymerization and being selected from the group consisting of alkaline-acting substances and amine salts of carboxylic acids, said mixture containing a weight ratio of the polyether to the alkene of about 98:2 to 70:30, up to about 15% by weight of the peroxide based upon the alkene, and up to 15% by weight of the curing agent based upon the polyether plus the monoaryl-2-alkene-1, and styrene being the only component in said mixture which contains unsaturated linkages which undergo addition polymerization.

6. A composition suitable for production of resinified products consisting of a mixture of styrene, glycidyl polyether of 2,2-bis(4-hydroxyphenyl)propane having a 1,2-epoxy equivalency greater than 1, a tertiary alkyl peroxide, and a polyamine which is free of unsaturated linkages which undergo addition polymerization, said mixture containing a weight ratio of the polyether to the styrene of about 98:2 to 70:30, about 4 to 12% by weight of the peroxide based upon the styrene, and about 4 to 12% by weight of the polyamine based upon the polyether and the styrene, and styrene being the only component in said mixture which contains unsaturated linkages which undergo addition polymerization.

References Cited in the file of this patent

UNITED STATES PATENTS

| 2,450,552 | Hurdis | Oct. 5, 1948 |
| 2,682,515 | Naps | June 29, 1954 |
| 2,691,007 | Cass | Oct. 5, 1954 |
| 2,707,177 | Skiff et al. | Apr. 26, 1955 |
| 2,712,535 | Fisch | July 5, 1955 |
| 2,848,433 | Eirich | Aug. 19, 1958 |

FOREIGN PATENTS

| 629,111 | Great Britain | Sept. 13, 1949 |

OTHER REFERENCES

"Research" (London), volume 7, 1954; pages 351–352.